(12) United States Patent
Gaal

(10) Patent No.: US 7,443,339 B2
(45) Date of Patent: Oct. 28, 2008

(54) CROSS-CORRELATION SUPPRESSION TECHNIQUE FOR POSITION LOCATION RECEIVERS

(75) Inventor: Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 11/534,192

(22) Filed: Sep. 21, 2006

(65) Prior Publication Data

US 2007/0171126 A1    Jul. 26, 2007

Related U.S. Application Data

(60) Provisional application No. 60/763,163, filed on Jan. 26, 2006.

(51) Int. Cl.
*G01S 5/14* (2006.01)
*H04B 1/10* (2006.01)

(52) U.S. Cl. ............... 342/357.02; 375/148; 455/278.1

(58) Field of Classification Search ............ 342/357.02, 342/357.12; 375/148; 455/278.1
See application file for complete search history.

(56) References Cited

U.S. PATENT DOCUMENTS 5,612,978 A * 3/1997 Blanchard et al. .......... 375/350
6,407,699 B1   6/2002 Yang
6,477,196 B1 * 11/2002 Swanke et al. .............. 375/147
6,952,460 B1   10/2005 Van Wechel
7,177,614 B2 * 2/2007 Agarwal et al. ............. 455/296
7,277,475 B1 * 10/2007 Nguyen et al. .............. 375/148
2007/0024499 A1 * 2/2007 Bochkovskiy et al. . 342/357.12

OTHER PUBLICATIONS

Laster, D et al, "Interference Rejection in Digital Wireless Communications," IEEE Signal Processing Magazine, IEEE Service Center, Piscataway, NJ, US, vol. 14(3), May 1997.

* cited by examiner

*Primary Examiner*—Gregory C Issing
(74) *Attorney, Agent, or Firm*—Andrea L. Mays; Shyam K. Parckh; Thomas R. Rouse

(57) ABSTRACT

The present disclosure provides various methods and devices for suppressing cross-correlation effects in positioning signals. When there is a power imbalance between a weaker positioning signal and an interfering positioning signal, and certain Doppler offsets exist, cross-correlation may make it difficult to acquire the weaker signal. However, a receiver may use the transmit signal spectrum of the interfering signal to identify frequency bins which contain a lower power for the transmitted interfering signal. The receiver then emphasizes the identified frequency bins in the detection of the desired positioning signal.

42 Claims, 8 Drawing Sheets

CROSS-CORRELATION SUPPRESSION TECHNIQUE FOR POSITION LOCATION RECEIVERS

RELATED APPLICATIONS

This application claims priority to U.S. Provisional Application Ser. No. 60/763,163, filed on Jan. 26, 2006, which is assigned to the assigner hereof and which is hereby expressly incorporated by reference in its entirety for all purposes.

FIELD OF THE INVENTION

The present invention relates to position determination for mobile stations in general and, in particular, to the suppression of cross-correlation for signals of such mobile stations.

BACKGROUND

Position determination systems are rapidly becoming more prevalent, as position location capabilities may now be found in an increasing number of new mobile handsets on the market. Position location technologies typically utilize wireless positioning signals transmitted from known locations. One widely used system of position determination is the Global Positioning System ("GPS").

In GPS systems, the positioning signals are concurrently transmitted from a number of satellite vehicles ("SVs") at known times, with each positioning signal transmitted at predefined carrier frequencies. On the ground, a GPS receiver attempts to acquire positioning signals from the SVs within its view. The times of arrival of the positioning signals, along with the location of the SVs and the times the signals were transmitted from each SV, are used to triangulate the position of the GPS receiver.

For civilian use, the SVs each transmit the positioning signals in the same carrier frequency (1575.42 MHz), and a C/A code modulates the carrier at 1.023 MHz, thereby spreading the signal over approximately a 1 MHz bandwidth. These positioning signals from the SVs each have a repetition period of 1023 chips, for a code period of 1 ms (i.e., 1,023 chips/1.023 MHz). Each SV has a different code, and because the receiver knows such codes, it can acquire a desired positioning signal from a number of received positioning signals. However, a side effect of the GPS C/A code design is that integrating across several 1 ms code periods generally does not significantly improve the processing gain for cross-correlation. This is because the same C/A code sequence is repeated every 1 ms; therefore, while the desired signal is coherently integrated, so is the interfering signal. Perfect coherent integration occurs when the target SV and the interfering SV have the same Doppler, or alternatively when the Doppler difference between them is close to an integer multiple of 1 kHz. This perfect coherent integration is generally not an issue of concern if the positioning signals are received with approximately the same power, as there is usually sufficient spreading gain.

The GPS signal structure is formatted to ensure that the "multiple access interference," i.e. the noise floor increase due to all satellites sharing essentially the same frequency range, stays below certain levels. This, however, assumes that all SV signals are received at approximately the same power level. But in many cases, the SV signals are received at various power levels. This could occur, for example, when there is a strong signal received through a window, which may interfere with the reception of much weaker signals attenuated by walls. Often the reception of the weaker signals is needed in order to achieve a fully determined position location. Therefore, when there is a sufficient power imbalance, and relative Doppler offset aligns (or when the Doppler offset is close to an integer multiple of 1 kHz), the interfering signal may prevent acquisition of the desired lower power SV positioning signals.

While differing navigation bit sequences between the desired lower power SV signal and the interfering higher power SV signal may give moderate reduction in cross-correlation, the problem remains in many instances. Given the number of visible SVs in the GPS constellation and the resulting number of SV pairs, such undesirable cross-correlation scenarios are likely to occur with regularity.

One suggested solution is to detect suspected cross-correlation cases based on power imbalance and relative Doppler offset, and exclude the suspected measurements from the navigation solution. This method results in improved reliability. However, because it is usually necessary to acquire signals from three or four SVs to determine position location, excluding measurement of the weaker signals may prevent location determination. Thus, it would be desirable to have alternative techniques for suppressing the cross-correlation effects of positioning signals in certain instances.

SUMMARY

The present disclosure provides various methods and devices for suppressing cross-correlation effects in positioning signals. When there is a power imbalance between a weaker positioning signal and an interfering positioning signal, and certain Doppler offsets exist, cross-correlation may make it difficult to acquire the weaker signal. However, a receiver may use the transmit signal spectrum of the interfering signal to identify frequency bins which contain a lower power of the transmitted interfering signal. The receiver then emphasizes the identified frequency bins in the detection of the desired positioning signal.

In one set of embodiments, the disclosure provides a method of reducing impact of cross-correlation in a desired positioning signal. Instances of cross-correlation may be detected by identifying a power imbalance between the interfering signal and the desired positioning signal, and concurrently identifying a Doppler difference between the interfering signal and the desired positioning signal which is zero, or an integer multiple of a reference code period.

In this set of embodiments, a number of positioning signals are received, and then correlated with a reference code of the desired positioning signal to produce a correlated output. The power spectra of an interfering signal is processed to identify a set of frequency bins where the interfering signal is weak relative to other frequency bins of the power spectra. A proportionally greater weight is allocated to the identified first set of frequency bins in the measurement of the correlated output. Moreover, among the identified first set, greater proportional weight may be allocated to the bins with weaker power.

In one embodiment, data defining transmit parameters of the interfering signal is received, and the power spectra of the interfering signal are calculated based at least in part on the received data. The transmit parameters may define a transmit signal spectrum of the interfering signal. Also, the transmit parameters may comprise a Doppler offset and a modulating data width attributable to the interfering signal. Various estimations may also be used to identify or otherwise calculate the power spectra of the interfering signal.

In another embodiment, the correlated output is used to identify a set of one or more frequency bins where the desired positioning signal is relatively strong, and a proportionally greater weight is allocated to that identified set in the measurement of the correlated output. The method described herein may be performed in the time domain or frequency domain, or any combination thereof may be used. The positioning signals described herein may be transformed from the time domain to the frequency domain using a discrete Fourier transform.

The desired positioning signal and the interfering signal may each be a position location signal transmitted from a different satellite, each signal comprising repeating codes of equal length. More specifically, the desired positioning signal and the interfering signal may each be a GPS signal transmitted from a different GPS satellite, each signal comprising a unique reference code transmitted at a GPS frequency. However, the positioning signals may emanate from a variety of other transmittal sources, as well.

In another set of embodiments, the disclosure describes a mobile station configured to reduce the impact of cross-correlation in a desired positioning signal. The mobile station includes an antenna configured to receive a number of positioning signals. The mobile station further includes a processing unit configured to carry out the methods described above. Specifically, the processing unit is configured to correlate the received positioning signals with a reference code of the desired positioning signal to produce a correlated output. It then processes the power spectra of an interfering signal to identify a set of frequency bins where the interfering signal is weak relative to the rest of the power spectra. The processing unit allocates a proportionally greater weight to the identified first set of frequency bins when measuring the correlated output. A memory is coupled with the processing unit, as well.

In one embodiment the mobile station includes a second processing unit configured to receive data through a second antenna, the data defining transmit parameters of the interfering signal. The second processing unit calculates the power spectra of the interfering signal based at least in part on the received data. The first and second processing units may comprise a single processor. Either processing unit may perform any of the other methods described above, as well.

In another set of embodiments, the disclosure sets forth a computer-readable medium having computer-executable instructions configured to reduce the impact of cross-correlation in a desired positioning signal. The computer-readable medium has computer-executable instructions to correlate the received positioning signals with a reference code of the desired positioning signal to produce a correlated output. The instructions may then process the power spectra of an interfering signal to identify a set of frequency bins where the interfering signal is weak relative to the rest of the power spectra. The instructions allocate a proportionally greater weight to the identified first set of frequency bins when measuring the correlated output. Moreover, in other embodiments, the instructions are formatted to perform one or more of the other methods described above.

In still another set of embodiments, the disclosure sets forth a communications device configured with means to reduce the impact of cross-correlation in a desired positioning signal. The device is configured with means for receiving a number of positioning signals, and means for correlating the received positioning signals with a reference code of the desired positioning signal to produce a correlated output. The device further includes means for processing the power spectra of an interfering signal of the plurality to identify a first set of one or more frequency bins where the interfering signal is weak relative to the rest of the power spectra. The device also includes means for allocating a proportionally greater weight to the identified first set of frequency bins than to the second set when measuring the correlated output. In other embodiments, the device further includes means to perform one or more of the other methods described above.

The disclosure also provides, in some embodiments, for a stand-alone processor configured to reduce the impact of cross-correlation in a desired positioning signal. As with the processing unit of the mobile station, the processor is configured to correlate a set of positioning signals with a reference code of the desired positioning signal to produce a correlated output. It then processes the power spectra of an interfering signal to identify a set of frequency bins where the interfering signal is weak relative to the rest of the power spectra. The processor allocates a proportionally greater weight to the identified first set of frequency bins when measuring the correlated output.

In an alternative embodiment, the disclosure sets forth a positioning system configured to reduce the impact of cross-correlation in a desired positioning signal. The system includes a number of transmitters, each configured to transmit positioning signals to a mobile station. The system also includes a base station which is configured to transmit data received from one of the transmitters. The system also includes a mobile station, in communication with both the transmitters and the base station. The mobile station is configured to correlate received positioning signals with a reference code of the desired positioning signal to produce a correlated output. It then receives the data transmitted from the base station, and calculates the power spectra of the interfering signal based at least in part on the received data, to thereby identify a first set of one or more frequency bins where the interfering signal is weak relative to a second set of frequency bins of the power spectra. The mobile station then allocates a proportionally greater weight to the identified first set of frequency bins when measuring the correlated output.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The description herein provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims. For instance, it should be appreciated that in alternative embodiments, the methods may be performed in an order different than that described, and that various steps may be added, substituted, or omitted. Also, features described with respect to certain embodiments may be combined with other embodiments.

In certain position determining systems, such as GPS, there may be a significant discrepancy in the received power of signals from different transmitters. One side effect of the code design in many systems is that integrating across several code periods does not necessarily improve the processing gain for cross-correlation (e.g., when different signals have a repeating code sequence of the same length). Therefore, while the desired signal is coherently integrated, so is the interfering signal. Perfect coherent integration occurs when the desired signal and the interfering signal have the same Doppler, or alternatively when the Doppler difference between them is close to an integer multiple of the inverse of the code period.

To address this set of issues, various embodiments of the invention may reduce the impact of cross-correlation in a desired positioning signal. In one embodiment, a mobile station correlates a number of received positioning signals with a reference code of the desired positioning signal, and thereby produces a correlated output. The mobile station processes the power spectra of a selected high power interfering signal, to identify one or more frequency bins where the interfering signal is weak. In measuring the correlated signal, the mobile station allocates a proportionally greater measurement to the identified frequency bins, where the interfering signal is weak, thereby reducing the impact of cross-correlation.

Figure 1:
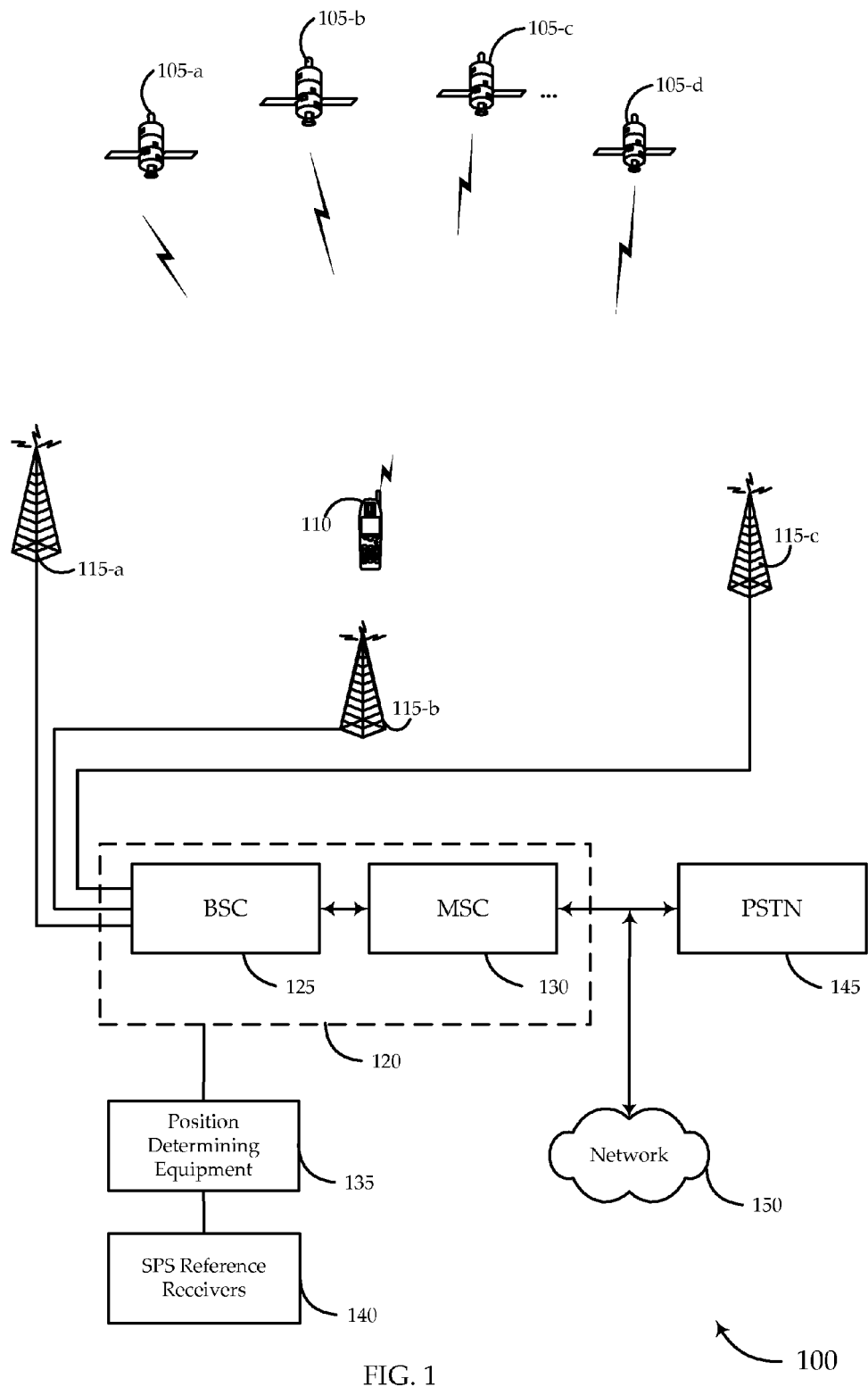
FIG. 1 illustrates a communications system in which a mobile station is configured to receive positioning signals according to various embodiments of the present invention.

Turning to FIG. 1, an exemplary communications system 100 with position determination capabilities is illustrated. FIG. 1 illustrates a mobile station (MS) 110 configured to receive positioning signals from a number of transmitters. As used herein, a mobile station refers to a device such as a cellular telephone, wireless communication device, user equipment, or other personal communication system (PCS) device. For example, the positioning signals may be received from a set of SVs 105 comprising a satellite positioning system (SPS). The SPS may comprise any communications system that utilizes signals from SVs to determine the position of a receiving device, such as Global Positioning System (GPS), Galilleo, GLONASS, NAVSTAR, a system that uses satellites from a combination of these systems, or any SPS developed in the future, each referred to generally herein as a Satellite Positioning System (SPS). As used herein, an SPS will also be understood to include pseudolite systems, and any systems which include the use of such pseudolites in position determination.

Generally, positioning signals are transmitted from a number of SVs at known times. The times of arrival of the positioning signals, along with the location of the SVs and the times the signals were transmitted from each SV, are used to triangulate the position of the receiver.

In the FIG. 1 embodiment, the MS 110 also communicates with one or more base stations 115, here depicted as cellular towers. The base stations 115 may comprise any collection of base stations utilized as part of a communication network 100 that communicates with the MS 110 using wireless signals. The MS 110 will typically communicate with the base station 115, for example, that provides the strongest signal strength at the MS 110.

The base stations 115 are communicatively coupled with a cellular infrastructure network 120. In one embodiment, the cellular infrastructure network 120 is communicatively coupled with position determining equipment (PDE) 135 (e.g., a server or other computer). The PDE 135 works in conjunction with one or more SPS reference receivers 140, and is capable of exchanging SPS-related information with an MS 110 via the base stations. The PDE 135 may assist the MS 110 to perform range measurements and position solutions. For example, the PDE 135 may send SPS assistance data such as SV 105 position (ephemeris) information to the MS, to enhance the signal acquisition process (e.g., in an Assisted GPS (A-GPS) session). The PDE 135 may include one or more databases to store the data at issue.

Using the ephemeris data, the MS 110 may be able to more quickly compute position results. Alternatively, the MS 110 can return information such as pseudorange measurements back to the PDE 135, which may then compute the position of the MS 110, according to various embodiments of the present invention. Thus, the PDE 135 may be utilized in various ways to gather SPS information and share processing tasks with an MS 110. There are a number of alternative variations known in the art in which a PDE 135 may assist an MS 110 by providing ephemeris information and performing certain calculations, as is clear to those skilled in the art.

Each of the base stations 115 may be coupled to a Base Station Controller (BSC) 125 within the cellular infrastructure network 120 that routes the communication signals to and from the appropriate base stations 115. The BSC 125 is coupled to a Mobile Switching Center (MSC) 130 that can be configured to operate as an interface between the user terminal 110 and a Public Switched Telephone Network (PSTN) 145. The MSC may also be configured to operate as an interface between the MS 110 and a network 150. The network 150 can be, for example, a Local Area Network (LAN) or a Wide Area Network (WAN). In one embodiment, the network 150 includes the Internet. Therefore, the MSC 130 is communicatively coupled with the PSTN 145 and network 150.

While the above description relates to SPS, it is worth noting that in other embodiments the positioning signals may be received from other transmitters as well. Positioning signals may be transmitted from base stations 115 or other cellular towers for various time difference of arrival ("TDOA"), time of arrival ("TOA"), and combination methods. Thus, while much of the discussion is directed at SPS, those skilled in the art will recognize that the principles are broadly applicable to other positioning signals, as well.

Therefore, position determination techniques described herein may be used for various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

It may be worthwhile, at this point, to engage in a brief discussion highlighting certain issues of concern in positioning systems. One such issue is the accurate determination of the distance from the transmitter to a receiver (e.g., the MS 110). This distance is calculated by measuring the time of arrival of a signal transmitted from the transmitter to the receiver. Again referring to GPS for exemplary purposes only, each SV transmits carrier frequencies each modulated with unique pseudo random noise (PN) codes. The civilian C/A code utilizes a carrier frequency operating at 1575.42 MHz. The receiver knows the PN codes, and demodulates the received positioning signals to extract the PN codes, noting the time they arrived at the receiver. A locally generated pseudo random code is synchronized to the demodulated pseudo random code. The delay between the two pseudo random codes represents the time of arrival of the transmitted signal. The distance from the satellite can then be determined by multiplying the time of arrival by the velocity of light. Because the location of the satellites is known, position can generally be determined with signals from three or four SVs.

Figure 2:
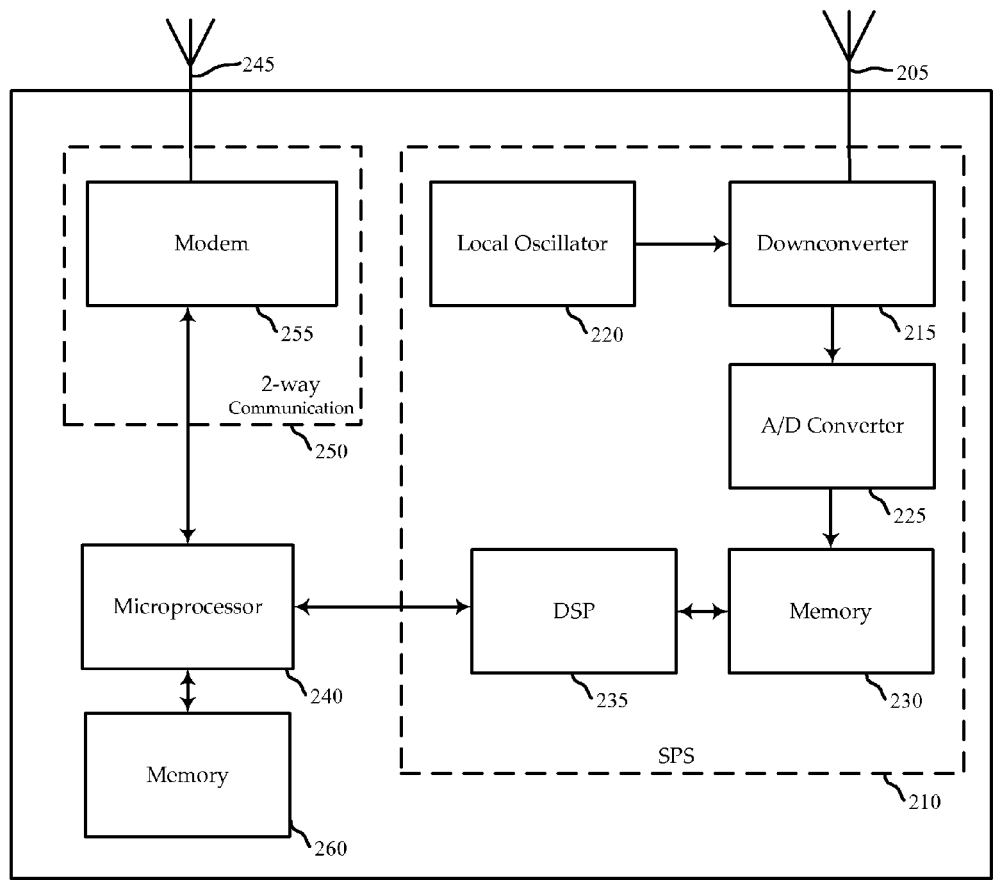
FIG. 2 is a block diagram illustrating a configuration of a receiver configured according to various embodiments of the present invention.

FIG. 2 illustrates an exemplary block diagram of a receiver 200 that may, for example, be implemented in the MS 110 of FIG. 1. An antenna 205 serves as the interface between the positioning signals and the receiver 200. Although the illustrated receiver may be used with a variety of different SPS configurations, specific references to GPS may be used to better illustrate the use of the invention, but should not be construed in any way to limit applicability of principles discussed herein. The antenna 205 may tuned to optimally receive positioning signals at the relevant frequency range.

In this embodiment, the positioning signals received by the antenna 205 are coupled to a signal processing block 210 specifically configured to process the positioning signals. Specifically, the antenna 205 is coupled with a downconverter 215 which serves to convert the RF signals received by the antenna 205 to baseband signals. The downconverter 215 includes mixers to receive mixing frequencies from a Local Oscillator (LO) 220 to perform the downconversion. The downconverter 215 may also include filters and amplifiers (not shown) to maximize the quality of the resultant set of baseband positioning signals. The mixer within the downconverter 215 acts to effectively multiply the received signal with the LO 220 signal. Filtering or amplification of the signal within the downconverter 215 is not shown in order to simplify the block diagram.

Two mixers may be used in the downconverter when the received signal is quadrature modulated. A first mixer includes an input comprising the LO 220 signal, while the second mixer includes an input comprising the LO 220 signal offset by ninety degrees in a phase shifter (not shown). The resultant output of the first mixer is the incident phase output (I) and the resultant output of the second mixer is the quadrature phase output (Q).

The outputs from the downconverter 215 are coupled with an Analog to Digital (A/D) Converter 225 to digitize the downconverted signal to permit digital signal processing. The signal Dopplers and the PRN codes are preserved after the mixing process, while the carrier frequency is lowered. Thus, this output essentially comprises the received positioning signals, with the carrier frequency removed. This output, or selected parts thereof, may be stored in Memory 230 before and during processing.

The output is then processed by the DSP 235. The DSP 235 includes correlating functions used to determine the phase offset of the received positioning signals. In one embodiment, the receiver has no knowledge as to its position when powered on, so the DSP 235 processes the positioning signals to determine the receiver's initial position by searching through all the possible PN code sequences transmitted by each SV. Additionally, the DSP 235 may need to search through all of the possible phases and all possible Doppler offsets of all possible pseudo random codes. The search may be performed by a number of correlators in the DSP 235 operating in parallel to lessen the search time required. In this embodiment, each correlator operates on a single PN sequence. The correlator attempts to determine the phase offset of an internally generated PN code to the code received from the satellite. PN codes that do not correspond to the satellite signal will not have correlation because of the random nature of the codes. Additionally, the correct pseudo random code will not likely have correlation with the received signal unless the phases of the two code signals are aligned. Thus, the correlators of the DSP 235 will provide an indication of correlation when a desired PN code having the same PN code as the received signals is searched for, and when the phases of the two signals are aligned. In other embodiments, other correlating mechanisms and types of correlators may be used.

In GPS, because each SV is assigned a unique PN code, the identification of a PN code identifies a particular SV as its source. Additionally, the determination of the code phase offset determines the time of arrival of that signal. But now consider how these repeating codes of equal length may present certain problems. A side effect of the GPS C/A code design is that integrating across several 1 ms code periods generally does not significantly improve the processing gain for cross-correlation. This is because the same C/A code sequence is repeated every 1 ms; therefore, while the desired signal is coherently integrated, so is the interfering signal. Perfect coherent integration occurs when the target SV and the interfering SV have the same Doppler, or alternatively when the Doppler difference between them is close to an integer multiple of 1 kHz. As noted above, this may become problematic when there are power imbalances between a desired positioning signal, and a higher power interfering signal.

Assume for purposes of discussion that only two SV signals are present, one of which is the weak desired signal, and the other a strong interferer. Assuming that the transmitted signals are known (for longer than 20 ms integration assume the use of navigation bit prediction), their power spectra may also be calculated. While it is true that the power spectra of the received signal may not be known unless the channel transfer function is accounted for, the transmit signal spectrum may still be used to reduce the impact of cross-correlation. For example, if a frequency bin contains very little power of the transmitted interfering signal, then that frequency bin may be emphasized in the detection of the desired signal.

In more generic terms, the total received signal may be processed by the DSP 235 according to the following formula:

$$C(\tau) = IDFT\left\{\frac{DFT\{r(t)\} \cdot DFT\{c_d(-t)\}}{|DFT\{c_i(t)\}|^2 + N \cdot N_0}\right\} \quad \text{Eq. 1}$$

where $C(\tau)$ is the improved correlator output as a function of code phase $\tau$; $r(t)$ is the received set of positioning signals, $c_d(t)$ is the C/A code corresponding to the desired SV positioning signal, $c_i(t)$ is the C/A code corresponding interfering signal; N is the DFT length and $N_0$ is the thermal noise spectral density. Further, the discrete Fourier transform (DFT) and inverse discrete Fourier transform (IDFT) are defined as $$DFT\{f(kT)\} = F(nT^{-1}) = \sum_{k=0}^{N-1} f(kT) \cdot e^{-2\pi i \frac{kn}{N}}$$

$$IDFT\{F(nT^{-1})\} = f(kT) = \frac{1}{N}\sum_{n=0}^{N-1} F(nT^{-1}) \cdot e^{2\pi i \frac{kn}{N}}$$

Turning to Eq. 1, the DSP 235 processes the digital representation of a set of positioning signals r(t) to transform it from the time domain to the frequency domain using the discrete Fourier transform. The DSP 235 also processes the digital representation of the reference code $c_d(-t)$ to transform it from the time domain to the frequency domain using the discrete Fourier transform. Although in a GPS signal the reference code comprises the desired C/A code, in other embodiments the reference code may comprise other Gold codes, orthogonal codes, pilot codes, other PN codes, etc. The DSP 235 then correlates the set of positioning signals and the reference code by multiplying the Fourier transforms to produce a correlated output. The correlated output identifies the frequency bins where the desired positioning signal is relatively strong.

As for the denominator, the DSP 235 transforms the digital representation of the interfering signal to the frequency domain using the discrete Fourier transform. The DSP 235 calculates the power spectra of the interfering signal by taking the absolute-value squared of the Fourier transform of its digital representation, thereby identifying frequency bins where the interfering signal is relatively weak. The power spectra give a plot of the portion of a signal's power falling within given frequency bins.

The DSP 235 then divides the correlated output by the power spectra (plus the N and $N_0$ terms) to identify frequency bins from the correlated output where the interfering signal is weaker than in other bins. The result of the frequency domain division, therefore, is that the frequency bins where the desired positioning signal is relatively strong can be matched with frequency bins where the interfering signal is relatively weak. In detecting the desired signal, the matched frequency bins may be emphasized, in proportion to relative strengths and weaknesses of the desired vs. the interfering signals. Said differently, when measuring the desired signal, proportionally greater weight may be allocated to the frequency bins in which the desired signal is strong and the interfering signal is weak.

Note that the N and $N_0$ terms can be considered constants, and thus require no further discussion. The DSP 235 may then reverse the process by computing the inverse discrete Fourier transform to find the improved correlator output $C(\tau)$.

If there is more than one interferer, the received signal may be processed by the DSP 235 according to the following formula.

$$C(\tau) = IDFT\left\{\frac{DFT\{r(t)\} \cdot DFT\{c_d(-t)\}}{\sum_i |DFT\{c_i(t)\}|^2 + N \cdot N_0}\right\} \quad \text{Eq. 2}$$

Note that the improvement may be the greatest with a single dominant interferer. But for GPS, it is reasonable to assume that most of the time there is only a single dominant interferer, because while it is quite possible to have more than one high power interferers, it is unlikely that more than one of them is exactly at a multiple of 1 kHz Doppler offset from the SV of interest. Given a single dominant interferer assumption, there should be enough variation between to the power spectra of the desired signal and the interfering signals to find a sufficient number of "interference-free" or low interference dimensions in the frequency domain.

Note that the discrete Fourier transform (DFT) algorithms discussed herein are used to illustrate examples of algorithms that generate frequency samples. As evident to those skilled in the art, any suitable algorithm that generates appropriate frequency samples may be utilized as an alternative to the DFT algorithms, including a fast Fourier transform. For example, the frequency samples may be generated using a DFT-like algorithm where the number and spacing of the frequency domain samples are not exactly that of a DFT; i.e., more or fewer frequency samples may be computed, and the spacing between the frequency domain samples may be narrower than that of a standard DFT operation. The frequency samples may be generated from digital or analog data, from observed data, or from previously calculated values. The calculated frequency samples are then used for subsequent operations. Similarly, and as evident to those skilled in the art, one or more of the above steps may be performed in whole or in part in the time domain.

Returning to Eq. 1, one possible issue with the calculations described above is the complexity of performing the required DFT and IDFT operations. The periodic nature of the spreading code may be used to reduce computational complexity. Assume, for example, that 100 ms coherent integration in deep search mode is used for a particular SV PN code in a GPS system. Instead of doing real-time correlation, or storing for off-line processing the required ~$10^5$ Chip×1 samples, alternatives are available. Specifically, the DSP 235 may roll and accumulate the received signal in order to create a length 1023 sequence, $r_f(k)$, given by the following equation:

$$r_f(k) = \sum_{m=1}^{100} r((1023 \cdot m + k) \cdot T_c) \cdot \exp(-2\pi i D_d(1023m+k) \cdot T_c) \cdot b_d(\lfloor m/20 \rfloor) \quad \text{Eq. 3}$$

$$k = 0, \ldots 1022$$

where m is the index of the C/A code period within the integration time, k is the chip index within the C/A code period, $T_c$ is the C/A chip duration, $D_d$ is the predicted Doppler of the desired signal, $b_d(.)$ is the predicted navigation bit for the desired signal.

The complexity may be further reduced by using stored versions of the power spectra of the interfering signal. Since the C/A codes are constant, hard coded versions of their power spectra, $S_i(k)$, k=0,1, . . . 1022, may be used, each corresponding to zero Doppler and no navigation message bit modulation. Before applying the stored power spectra in Eq. 1, corrections should be applied in order to restore the Doppler and the predicted navigation bits. First, an integer and fractional relative Doppler may be computed as follows where $D_i$ is the estimated Doppler of the interferer:

$$D_i^{integer} = \lfloor (D_i - D_d)/1000 \rfloor \quad \text{Eq. 4}$$

$$D_i^{fractional} = (D_i - D_d)/1000 - D_i^{integer} \quad \text{Eq. 5}$$

Then, an approximate power scaling factor, $P_i$, may be computed as follows:

$$P_i = \hat{P}_i \cdot \left| \sum_{m=1}^{100} b_d(\lfloor m/20 \rfloor) \cdot b_i(\lfloor (m+\Delta)/20 \rfloor) \cdot \exp(2\pi i D_i^{fractional} m) \right|^2 \quad \text{Eq. 6}$$

where $P_i$ is the estimated total power received from the interferer, $b_i(.)$ is the predicted navigation bit for the interfering signal, and Δ is the predicted time offset, expressed in number of C/A code periods, between the navigation bit boundaries in the desired and in the interfering signal. The offset term Δ is required because while the navigation bit boundaries are aligned at the time of transmission in all GPS signals, the same condition does not exist in general in the received signal, due to propagation delay differences.

Finally, based on the values computed in Eqs. 4 and 6, the following substitution may be made in Eq. 1.

$$|DFT\{c_i(t)\}|_k^2 = P_i \cdot S_i(k \oplus -D_i^{integer}), k=0,1,\ldots 1022 \quad \text{Eq. 7}$$

where ⊕ represents modulo 1023 addition.

As can be seen in Eq. 7, the computed integer Doppler is used as a cyclic offset applied to the stored spectrum. Since the frequency spacing is 1 kHz for the stored spectrum, and the dominant interferer has a relative Doppler offset which is a multiple of 1 kHz, there is no apparent need for any interpolation, and simple offsetting of the index suffices. For the other interferers, for which the relative Doppler offset is not a multiple of 1 kHz, $P_i$ will likely be small, so the corresponding terms in Eq. 2 may be ignored altogether. In other words, the sum shown in the denominator in Eq. 2 could consist of a single term, with i corresponding to the dominant interferer. Note that some of these calculations contain approximations, but this may be discounted because the power spectrum is invariable under phase offsets and time delays.

As can be noted from Eqs. 4-7, in some embodiments, the transmit parameters of the interfering signal may not be known until at or about the time the interfering signal is transmitted. Thus, while stored versions of the power spectra of the interfering signal may be used, corrections may need be applied in order to restore the Doppler and the predicted navigation bits. Specifically, data indicative of the Doppler offset and a modulating data width attributable to the interfering signal may be received separately from the received positioning signals. In another embodiment, the transmit signal spectrum of the interfering signal may be received separately from the received positioning signals. By way of example, FIG. 1 illustrates SPS reference receivers 140 that may receive a variety of timing, signal structure, and ephemeris data from SVs 105. The PDE 135 may receive and process this data, and forward it to a MS 110 via a base station 115. This data may then be received from the base station 115, for example, by a receiver 200 in the MS 110. As illustrated in FIG. 2, an antenna 245 may wirelessly receive this data. A modem 255 in the 2-way communication (e.g., cellular) component 250 of the receiver 200 may receive this data from the antenna 245. The data comprising the transmit parameters of the interfering signal may then be forwarded to the microprocessor 240, and may be further processed, and stored in the receiver memory 260. Therefore, the transmit parameters and other data related to the interfering signal may be received separately from the received positioning signals, through SPS reference receivers 140 and a cellular network 120. Also, this data related to the interfering signal may be processed to varying degrees by the PDE 135 or other components of the cellular infrastructure network 120; or, this data may be raw data processed by the microprocessor. A number of alternatives are available, as evident to those skilled in the art.

Figure 3:
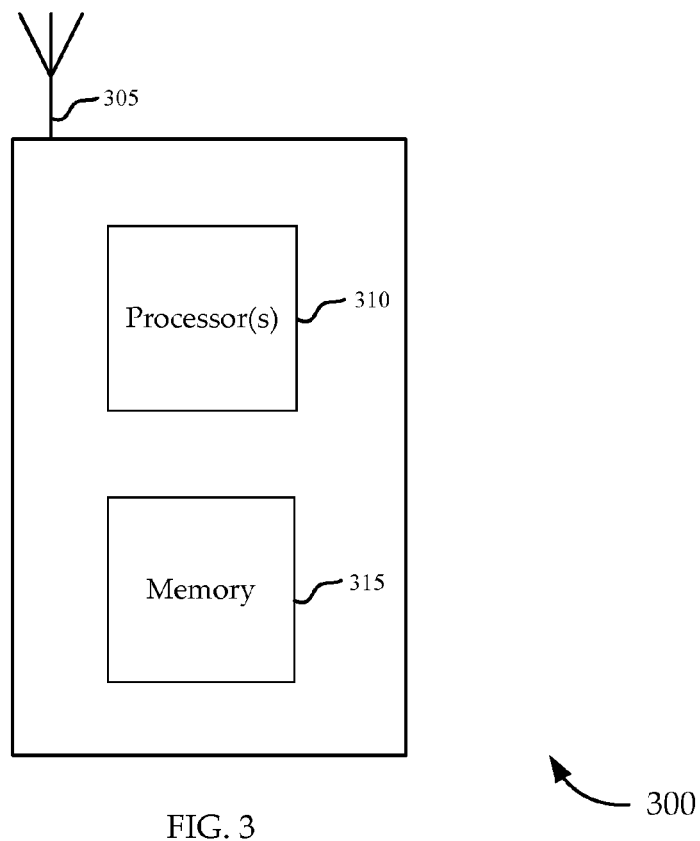
FIG. 3 is a block diagram illustrating an alternative configuration of a receiver configured according to various embodiments of the present invention.

It should be noted that while certain operations and techniques described above are performed with the DSP 235 and/or microprocessor, they may be implemented by various means depending upon the application. For example, these methodologies may be implemented in hardware, firmware, software, or a combination thereof. FIG. 3 illustrates an exemplary block diagram of a receiver 300 that may, for example, be implemented in the MS 110 of FIG. 1. An antenna 305 serves as the interface to receive a number of positioning signals at the receiver 300. For a hardware implementation, the processor(s) 310 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Memory 315 may be used, for example, to store the received positioning signal in digitized form, along with intermediate calculations, ephemeris information, intermediate calculations, power spectra estimations and calculations, and so on.

Figure 4:
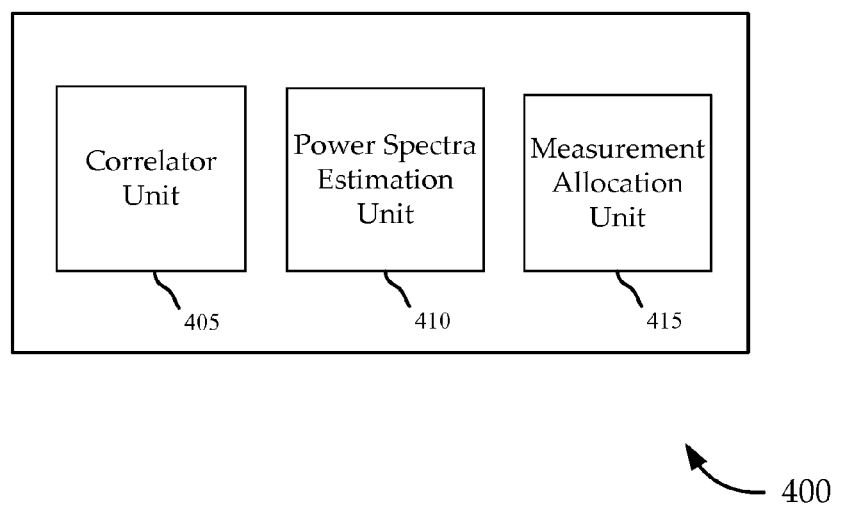
FIG. 4 is a block diagram illustrating an exemplary configuration of a processor configured according to various embodiments of the present invention.

FIG. 4 is an block diagram illustrating an exemplary processor 400, which may, for example, comprise a processor 310 of a hardware implementation of FIG. 3. However, the processor 400 may also simply be a stand-alone processor configured to perform functions described below. The processor may, but need not, be configured to be integrated into a MS 110, and thus may in some embodiments be located remotely from an MS 110. The processor 400 may include a number of processing units, including a Correlator Unit 405, which correlates a known reference code (e.g., a C/A code) of a desired positioning signal with a wider set of positioning signals to produce a correlated output. The processor 400 also includes a processing unit comprising a Power Spectra Estimation Unit 410, configured to estimate the power spectra of an interfering positioning signal to identify a set of frequency bins where the interfering signal is weak relative to other frequency bins of the power spectra. The processor 400 further includes a Measurement Allocation Unit 415, which is configured to allocate proportionally greater measurement of the correlated output to the set of frequency bins where the interfering signal is weaker. Moreover, the Measurement Allocation Unit 415 may be configured to allocate proportionally greater measurement to the bins of the set in which the interfering signal has weaker power. The processor 400 may be further configured with other processing units to perform other techniques described herein.

Turning back to FIG. 3, for a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example the memory 315 of receiver 300, and executed by a processor(s) 310. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored.

To illustrate how certain embodiments of the invention may be implemented, results of a exemplary simulation are described. The simulation assumes the existence of four SV signals, with parameters shown in Table 1 below.

TABLE 1

| SV | PRN ID | Total Rx Power (dBm/BW) | Doppler (kHz) | Path Delay (C/A Chips) |
|---|---|---|---|---|
| 1 | 1 | −150 . . . −144 | 0 | 0 |
| 2 | 2 | −127 | 1.0 | 0 . . . 5 |
| 3 | 3 | −129 | 0.421 | 0 . . . 5 |
| 4 | 4 | −131 | −2.646 | 0 . . . 5 |

Note that the simulation sets the signal power for SV #1 in steps of 0.5 dB in the simulations. The path delay for SV #1 is fixed, while for the other SV's, a random multipath profile is generated in each simulation instance. The multipath profile was Chip×1 spaced between 0 and 5 chips, inclusive. The simulation generated path coefficients according to a uniform delay spread profile.

Note that the received power for SVs #2 and #3 are slightly above the nominal (−130 dBm/BW). This is not unusual, since the new SVs are deployed with a power margin to safeguard against power drops due to aging. The simulation assumes the background noise to be −113 dBm/BW, which assumes a 1 dB receiver noise figure and a nominal 1 MHz bandwidth.

Figure 5:
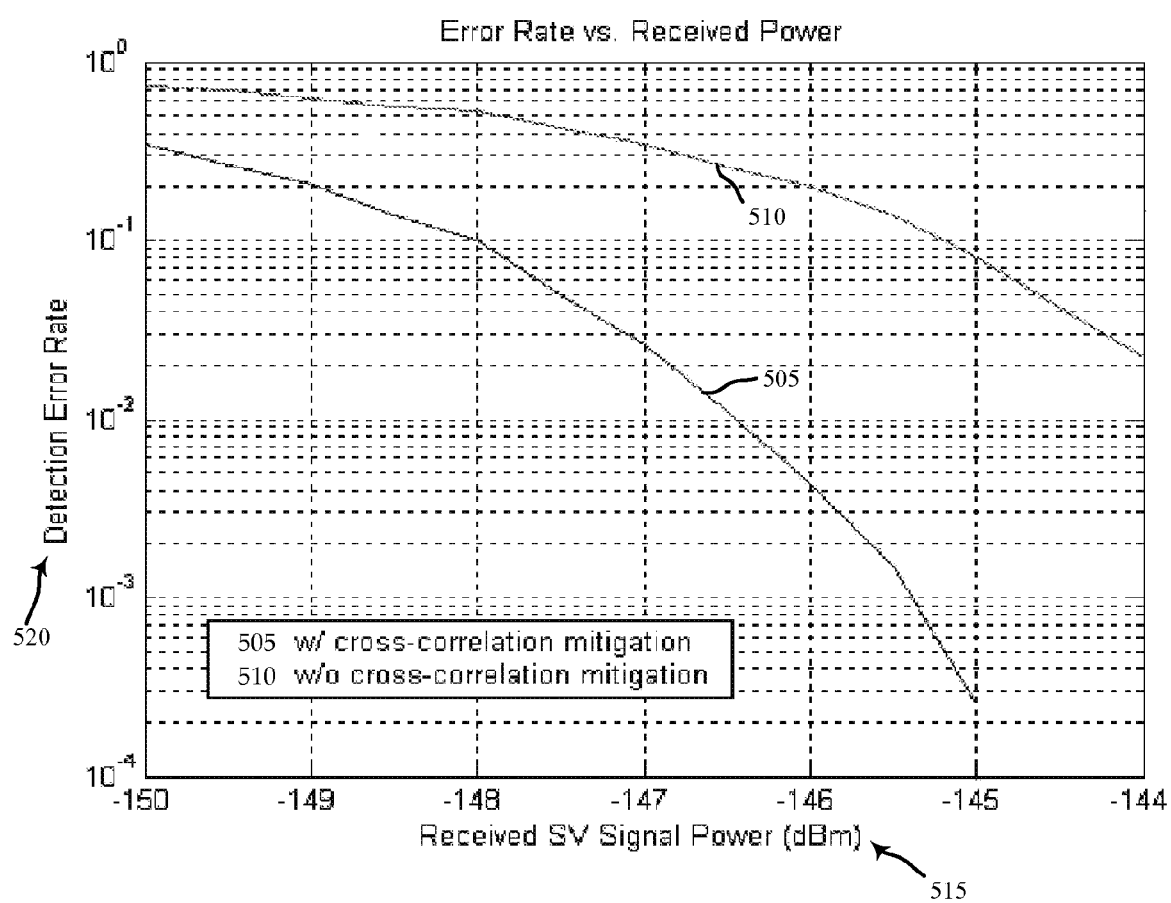
FIG. 5 is a graph illustrating error rate v. received power using cross-correlation techniques in accordance with various embodiments of the present invention.

The results from the simulation are illustrated in the graph 500 of FIG. 5. The detection error rate 520 was plotted in reference to the received SV signal power 515. The graph 500 illustrates the results with cross-correlation mitigation 505 according to embodiments of the invention, and without 510. The imperical detection error probability was determined based on 4000 trials. A detection error was declared if the weak SV signal was found in any code phase offset other than the zero offset, which corresponded to the simulated path delay. Note that in a real navigation solution an interpolated code phase approximation would be used, but that was not part of the simulation.

Figure 6:
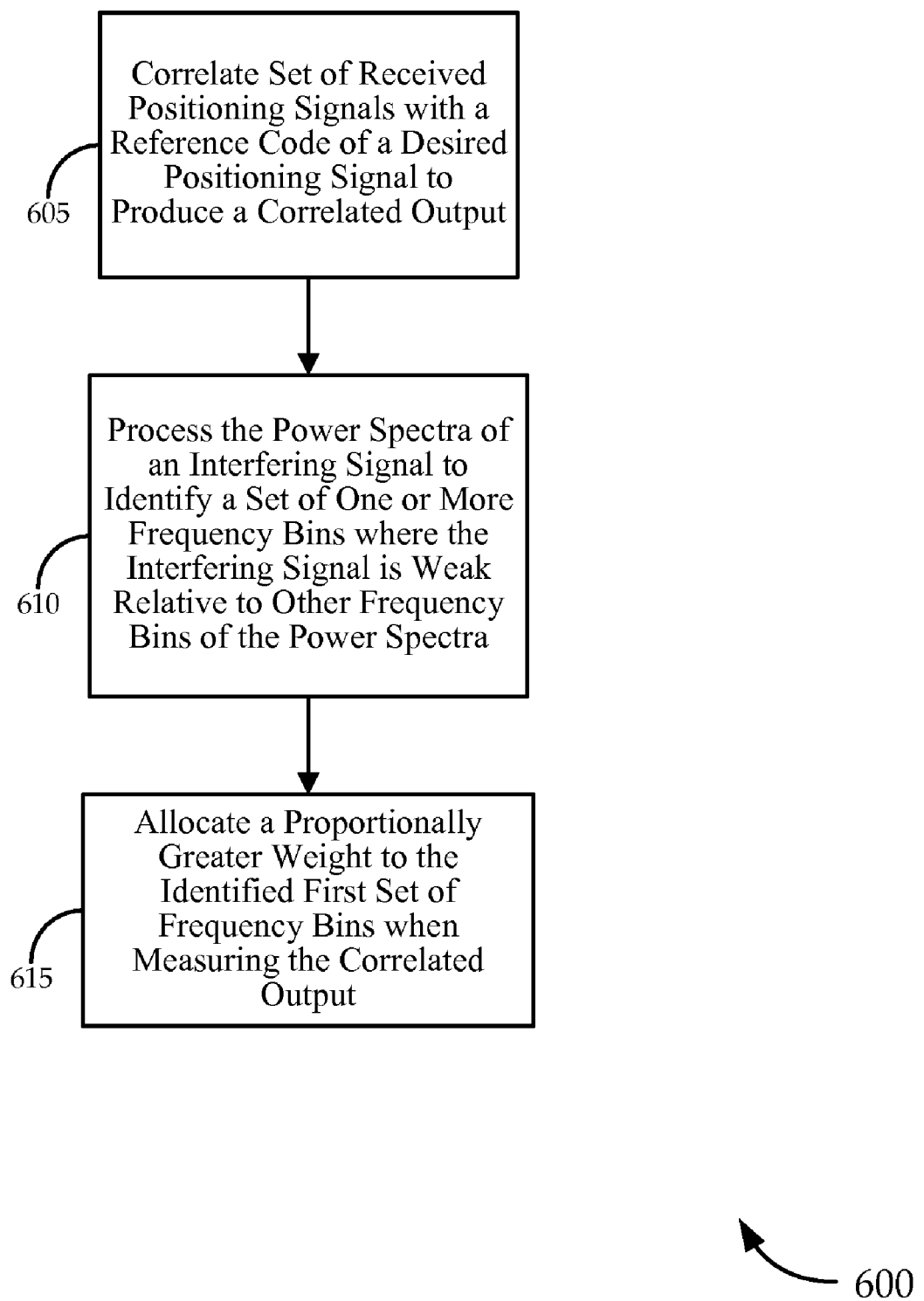
FIG. 6 is a flowchart illustrating a process of reducing the impact of cross-correlation in a desired positioning signal according to various embodiments of the present invention.

Referring next to FIG. 6, a flowchart of an embodiment of a process 600 of reducing impact of cross-correlation in a desired positioning signal is depicted. The process could take place, for example, on the MS 110 of FIG. 1. Note, however, that the process may take place in whole or in part at the PDE 135, or on another computer or server in the cellular infrastructure network 120. However, for purposes of discussion, assume that the process occurs on a receiver, such as the receivers 300, 400 of FIG. 3 or 4. The depicted portion of the process begins in block 605, where the receiver correlates a set of received positioning signals with a reference code of a desired positioning signal to produce a correlated output. At block 610, the receiver processes the power spectra of an interfering signal to identify a set of one or more frequency bins where the interfering signal is weak relative to other frequency bins of the power spectra. At block 615, the receiver allocates a proportionally greater weight to the identified first set of frequency bins in the measurement of the correlated output.

Figure 7:
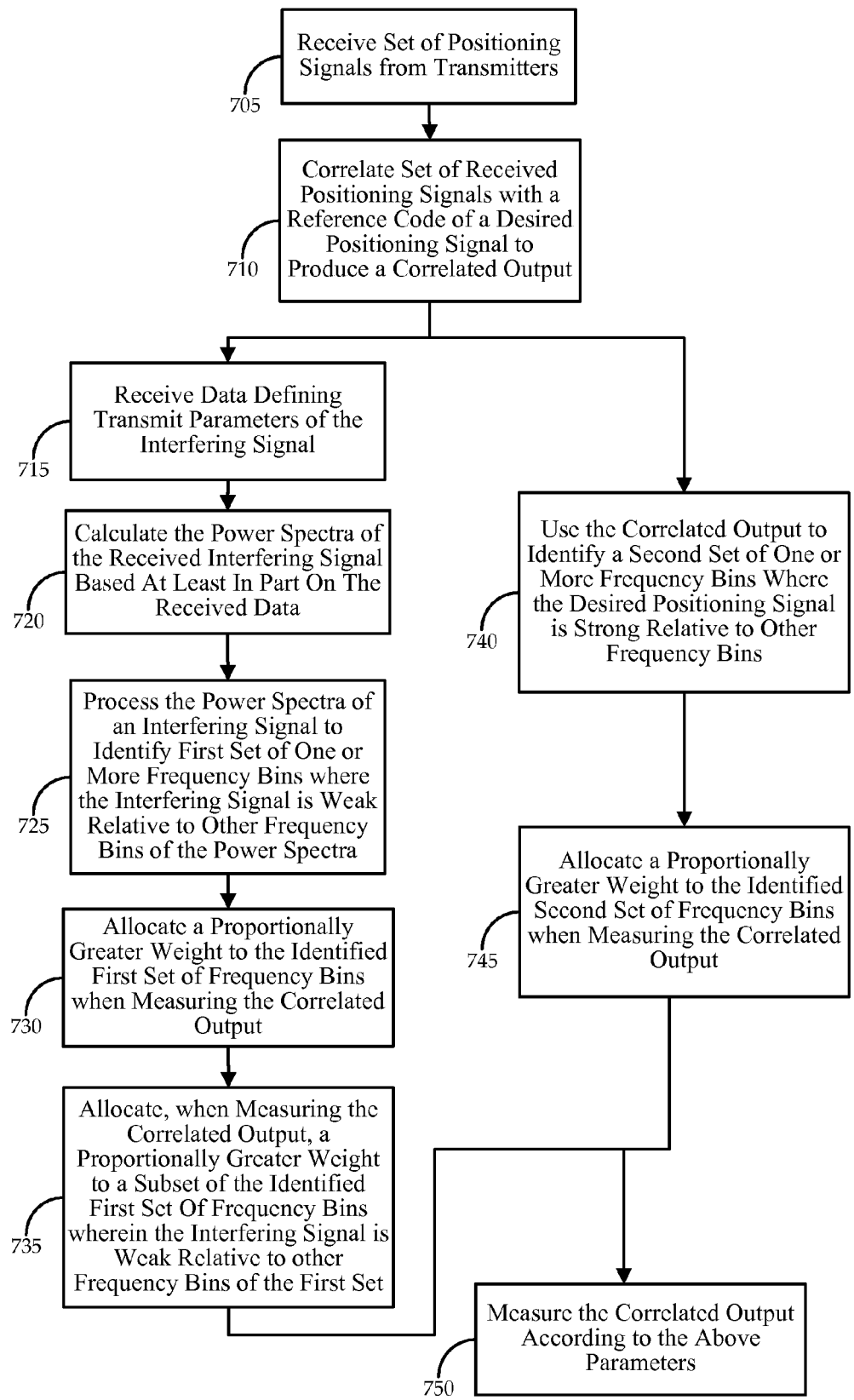
FIG. 7 is a flowchart illustrating an alternative process of reducing the impact of cross-correlation in a desired positioning signal according to various embodiments of the present invention.

Referring next to FIG. 7, a flowchart of an embodiment of an alternative process 700 for reducing impact of cross-correlation in a desired positioning signal is depicted. As with the process 600 set forth above, the alternative process 700 may take place in whole or in part on the MS 110 or the PDE 135 of FIG. 1, or on another computer or server. However, for purposes of discussion, assume that the process occurs on a receiver, such as the receivers 300, 400 of FIG. 3 or 4.

At block 705, the receiver wirelessly receives a set of positioning signals from a number of transmitters. At block 710, the receiver correlates the set of received positioning signals with a reference code of a desired positioning signal to produce a correlated output. At block 715, the receiver wirelessly receives data defining transmit parameters of the interfering signal. The receiver then, at block 720, calculates the power spectra of the received interfering signal based at least in part on the received transmit parameter data.

At block 725, the receiver processes the power spectra of the interfering signal to identify a first set of frequency bins where the interfering signal is weak relative to other frequency bins of the interfering signal power spectra. The first set can be determined by identifying bins where the interfering signal power spectra is less than the desired signal. At block 730, the receiver allocates a proportionally greater weight to the identified first set of frequency bins in the measurement of the correlated output. Next, the system can optionally process the first set of frequency bins to identify a subset of the first set, the subset comprising bins of the first set where the interfering signal is weakest relative to the other frequency bins of the first set. The system can then allocate a proportionally greater weight to the subset of the frequency bins. Thus, at block 735, the receiver allocates a proportionally greater weight to the subset (i.e., a greater weight than was given to the bins of the first set) by identifying a subset comprising the weakest of the first set. A variety of parameters may be used for characterizing the distribution of the first set to determine the weakest bins of the first set for even greater weighting. For example, the subset can be identified as the bins of the first set that are below a threshold value of power spectra, or are below a percentile value of the first set bins, or are the "n" lowest bins of the first set, where "n" is a parameter that is set according to system resources and desired operational performance. Such alternative subset parameters should be apparent to those skilled in the art in view of the description herein. If desired, the subset parameter can be set to a "zero" or null condition, in which case no further weighting occurs other than that of block 725 and 730 processing.

At block 740, the receiver uses the correlated output to identify a second set of one or more frequency bins where the desired positioning signal is strong relative to other frequency bins. At block 745, the receiver allocates a proportionally greater weight to the identified second set of frequency bins in measuring the correlated output. At block 750, the receiver measures of the correlated output in accordance with the parameters set forth in blocks 730, 735, and 745. The measure of the correlated output comprises the detection of the desired positioning signal. In this way, the operation of blocks 725-745 permits the system to allocate greater weight to the frequency bins in which the desired signal is strong and the interfering signal is weak.

Figure 8:
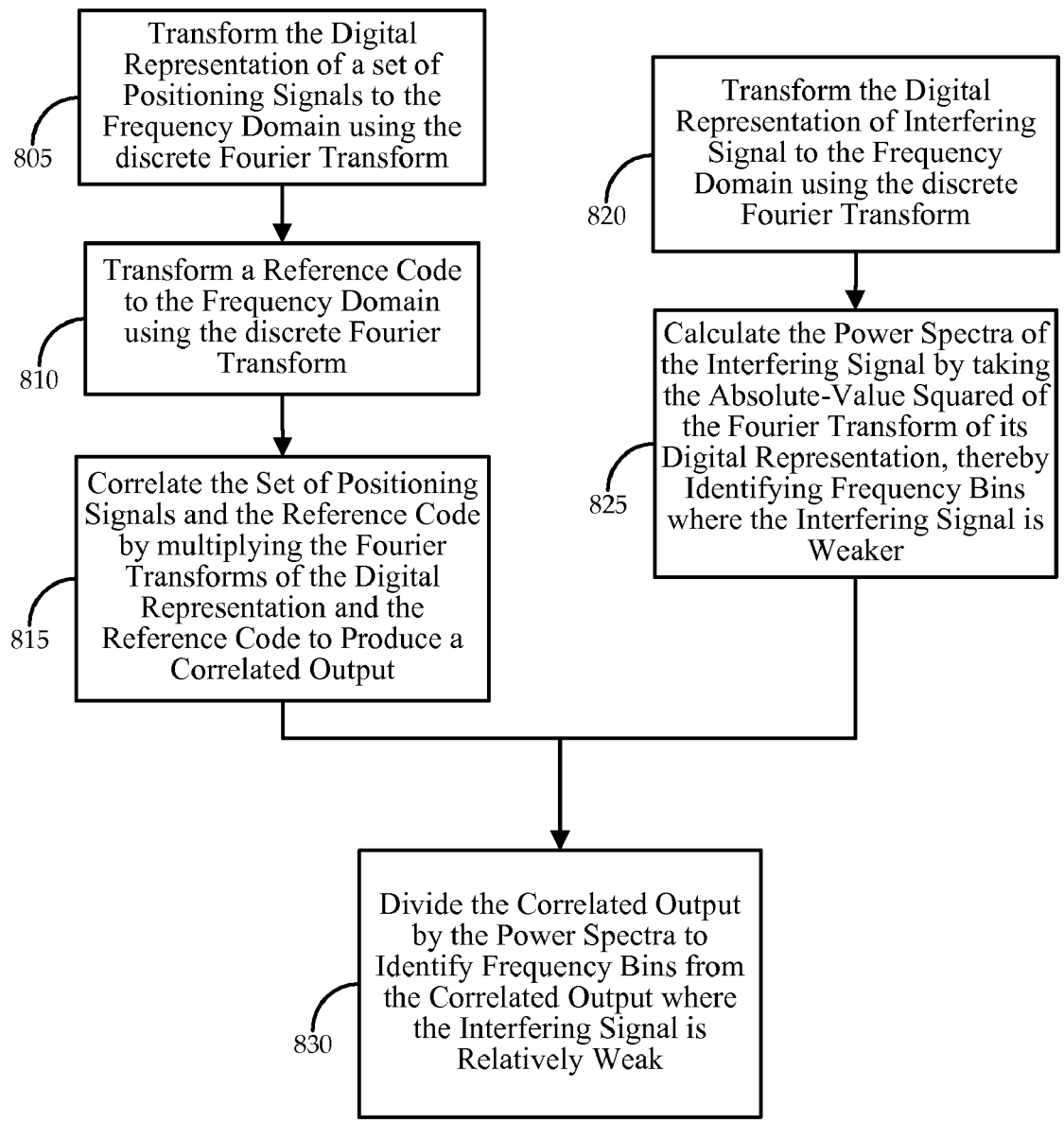
FIG. 8 is a flowchart illustrating a process of reducing the impact of cross-correlation in a desired positioning signal using a discrete Fourier transform, according to various embodiments of the present invention.

FIG. 8 is a flowchart illustrating a process 800 of reducing the impact of cross-correlation in a desired positioning signal using a discrete Fourier transform. The process may take place, for example, in whole or in part on a processor, such as processor 300 of FIG. 3. However, for purposes of discussion, assume that the process occurs on a DSP, such as DSP 235 of FIG. 2.

At block 805, the DSP transforms the digital representation of a set of positioning signals to the frequency domain using the discrete Fourier transform. At block 810, the DSP transforms a reference code to the frequency domain using the discrete Fourier transform. Note that the input of the DFT is a time reversed version of the reference code in accordance with Eq. 1; or, alternatively, the complex conjugate of the DFT output can be taken. The DSP, at block 815, correlates the set of positioning signals and the reference code by multiplying their Fourier transforms to produce a correlated output.

At block 820, the DSP transforms a digital representation of an interfering signal from the time domain to the frequency domain using the discrete Fourier transform. At block 825, the DSP calculates the power spectra of the interfering signal by taking the absolute-value squared of the Fourier transform of its digital representation, thereby identifying frequency bins where the interfering signal is weaker. At block 830, the correlated output is divided by the power spectra to thereby identify the frequency bins from the correlated output where the interfering signal is relatively weak.

Figure 9:
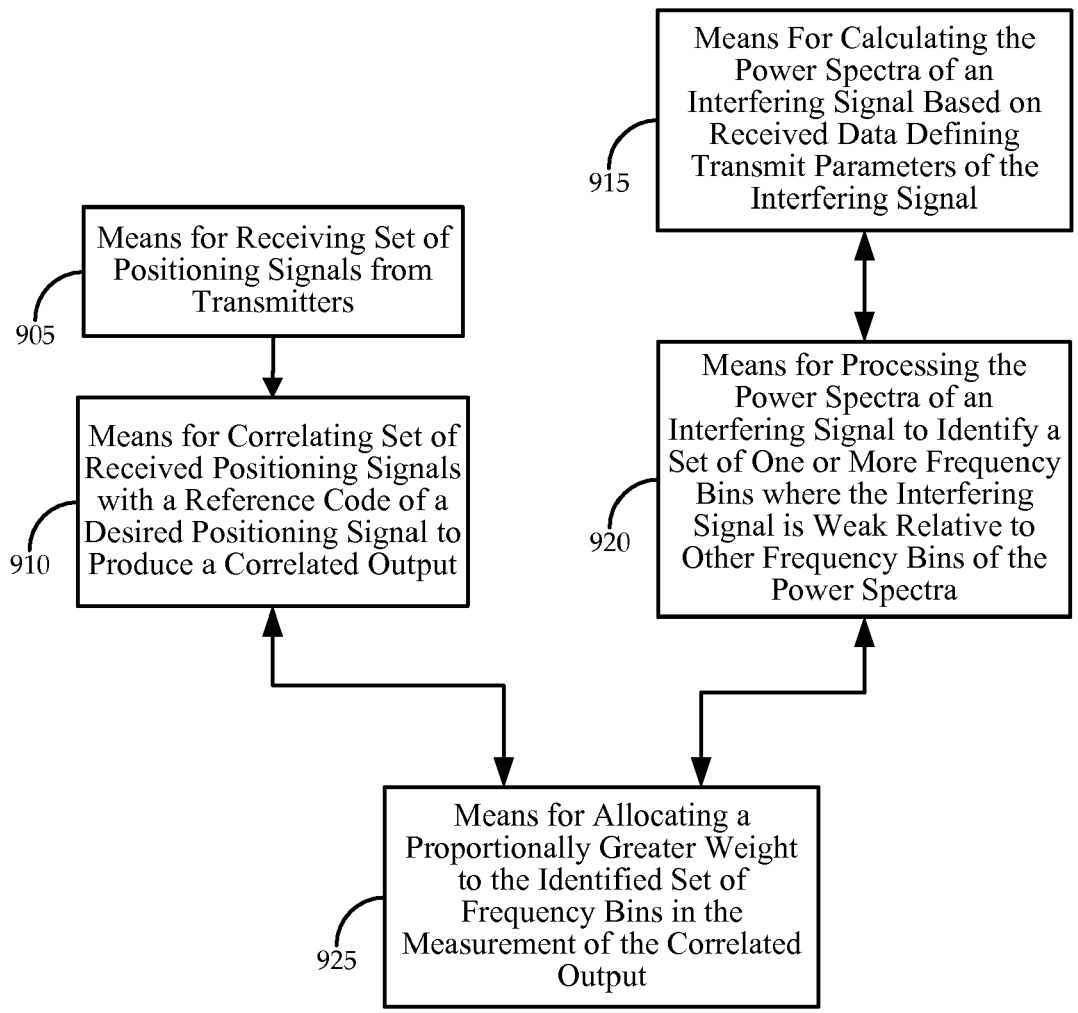
FIG. 9 is a block diagram of a communications device configured according to various embodiments of the present invention.

With reference to FIG. 9, a block diagram of an embodiment of a communication device 900 configured to reduce the impact of cross-correlation in a desired positioning signal is shown. The device 900 includes means for receiving 905 a set of positioning signals from a number of transmitters. It further includes means for correlating 910 the set of received positioning signals with a reference code of a desired positioning signal, to produce a correlated output. The device 900 also has means for calculating 915 the power spectra of an interfering signal, based on received data defining transmit parameters of the interfering signal. It includes means for processing 920 the power spectra of the interfering signal to identify a set of one or more frequency bins where the interfering signal is weak relative to other frequency bins of the power spectra. The device 900 further includes means for allocating 925 a proportionally greater weight to the identified set of frequency bins in the measurement of the correlated output.

As noted above, while much of the discussion above relates to GPS C/A codes, there are a number of other position location systems where the same principles are applicable. For example, there have been a number of proposed modifications for future GPS systems. Some of the enhancements are aimed at increasing the processing gain, which in turn is achieved with increasing the number of integrated spreading chips. It is also possible that there will be signal formats without any navigation message bit modulation, which simplifies signal processing in the receiver. In any case, the various methodologies contained in this disclosure are still applicable in many cases. Of course, the specific details, such as chip rate, spreading code period, receiver sampling rate, DFT/FFT size, receiver bandwidth, etc. would have to be adjusted according to the new signal parameters.

There have been other position location systems proposed, such as Galileo. Particularly when a number of satellites or transmitters share the same frequency band, and it is possible to observe selective shadowing of the received positioning signals, cross-correlation will likely be a factor. As noted above, the methods described in this disclosure are applicable to other future satellite-based positioning systems, as well. The implementation details and specific parameters would, of course, be adjusted according to the signal design in those new systems.

Terrestrial-based systems may be used independently, or in conjunction with GPS or other satellite-based navigation systems (hybrid position location). The basic principle of employing spectrally sensitive signal filtering aimed at reducing the impact of strong interferers is also applicable here. When a mobile station attempts to make cellular forward link (FL) measurements in order to carry out advanced forward link trilateration (AFLT) positioning, it is often faced with the challenge of measuring neighbor cells' signals while in close proximity to its serving cell. This is because in order to determine its position, the MS may need to measure relative distances to at least three individual cell site locations (note that different sectors of the same cell don't count as individual locations). Therefore, in a 'frequency reuse=1' cellular system, the MS often needs to make FL measurements in the presence of a strong interferer. In those cases, the methods described in this document will apply. There are a number of other terrestrial configurations where the principles disclosed herein are applicable, as evident to those skilled in the art.

It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flowchart. Although a flowchart may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the term "memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels, and/or various other mediums capable of storing, containing or carrying instruction(s) and/or data.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before after, or concurrently with the various embodiments. Accordingly, the above description should not be taken as limiting the scope of the invention, which is defined in the following claims.

What is claimed is:

1. A method of reducing impact of cross-correlation in a desired positioning signal, the method comprising:
    correlating a plurality of received positioning signals with a reference code of the desired positioning signal to produce a correlated output;
    processing power spectra of an interfering signal of the plurality to identify a first set of one or more frequency bins where the interfering signal is weak relative to a second set of frequency bins of the power spectra; and
    allocating a proportionally greater weight to the identified first set of frequency bins than the second set when measuring the correlated output.

2. The method of claim 1, further comprising:
    receiving data defining transmit parameters of the interfering signal; and
    calculating the power spectra based at least in part on the received data.

3. The method of claim 2, wherein the transmit parameters comprise a Doppler offset and a modulating data width each attributable to the interfering signal.

4. The method of claim 2, wherein the transmit parameters define a transmit signal spectrum of the interfering signal.

5. The method of claim 1, further comprising:
    using the correlated output to identify a third set of one or more frequency bins where the desired positioning signal is strong relative to a fourth set of frequency bins;
    allocating a proportionally greater weight to the identified third set of frequency bins than the fourth set when measuring the correlated output.

6. The method of claim 5, wherein the first set comprises the third set.

7. The method of claim 1, further comprising:
    allocating, when measuring the correlated output, a proportionally greater weight to a subset of the identified first set of frequency bins wherein the interfering signal is weak relative to other frequency bins of the first set.

8. The method of claim 1, wherein at least one of the correlating, processing, and allocating steps is performed in the frequency domain.

9. The method of claim 8, further comprising:
    transforming at least one of the received positioning signals, the desired positioning signal, and the interfering signal from time domain to frequency domain using a discrete Fourier transform.

10. The method of claim 1, wherein the power spectra comprises estimated power spectra.

11. The method of claim 1, further comprising:
    detecting the cross-correlation by:
        identifying a power imbalance between the interfering signal and the desired positioning signal; and
        identifying a Doppler difference between the interfering signal and the desired positioning signal which is zero or an integer multiple of a reference code period.

12. The method of claim 1, wherein the desired positioning signal and the interfering signal are each a position location signal transmitted from a different satellite, each signal comprising repeating codes of equal length.

13. The method of claim 1, wherein the desired positioning signal and the interfering signal are each a GPS signal transmitted from a different GPS satellite, each signal comprising a unique reference code transmitted at a GPS frequency.

14. A mobile station configured to reduce impact of cross-correlation in a desired positioning signal, the mobile station comprising:
    an antenna configured to receive a plurality of positioning signals;
    a first processing unit coupled with the antenna, and configured to:
        correlate the plurality of received positioning signals with a reference code of the desired positioning signal to produce a correlated output;
        process power spectra of an interfering signal of the plurality to identify a first set of one or more frequency bins where the interfering signal is weak relative to a second set of frequency bins of the power spectra; and
        allocate a proportionally greater weight to the identified first set of frequency bins than the second set when measuring the correlated output; and
    a memory coupled with the processor.

15. The mobile station of claim 14, further comprising:
    a second antenna configured to receive data from a base station; and
    a second processing unit coupled with the first processing unit and the second antenna, and configured to receive data through the second antenna defining transmit parameters of the interfering signal,
    wherein the first processing unit calculates the power spectra based at least in part on the received data.

16. The mobile station of claim 15, wherein the received data comprises a Doppler offset and a modulating data width, each attributable to the interfering signal.

17. The mobile station of claim 15, wherein the first processing unit and the second processing unit comprise a single processor.

18. The mobile station of claim 14, wherein the first processing unit is further configured to:
    use the correlated output to identify a third set of one or more frequency bins where the desired positioning signal is strong relative to a fourth set of frequency bins; and
    allocate a proportionally greater weight to the identified third set of frequency bins than the fourth set when measuring the correlated output.

19. The mobile station of claim 14, wherein the first processing unit is further configured to:
allocate, when measuring the correlated output, a proportionally greater weight to a subset of the identified first set of frequency bins wherein the interfering signal is weak relative to other frequency bins of the first set.

20. The mobile station of claim 14, wherein the processing unit performs at least one of the correlating, processing, and allocating steps in the frequency domain.

21. The mobile station of claim 14, wherein,
the second processing unit is further configured to detect the cross-correlation by:
identifying a power imbalance between the interfering signal and the desired positioning signal; and
identifying a Doppler difference between the interfering signal and the desired positioning signal which is zero or an integer multiple of a reference code period.

22. The mobile station of claim 14, wherein the desired positioning signal and the interfering signal are each a position location signal transmitted from a different satellite, each signal comprising different repeating codes of equal length.

23. The mobile station of claim 14, wherein the desired positioning signal and the interfering signal are each a GPS signal transmitted from a different GPS satellite, each signal comprising a unique reference code transmitted at a GPS frequency.

24. A communications device configured to reduce impact of cross-correlation in a desired positioning signal, the device comprising:
means for receiving a plurality of positioning signals;
means for correlating the plurality of received positioning signals with a reference code of the desired positioning signal to produce a correlated output;
means for processing power spectra of an interfering signal of the plurality to identify a first set of one or more frequency bins where the interfering signal is weak relative to a second set of frequency bins of the power spectra; and
means for allocating a proportionally greater weight to the identified first set of frequency bins than the second set when measuring the correlated output.

25. The communications device of claim 24, further comprising:
means for receiving data defining transmit parameters of the interfering signal from a base station; and
means for calculating the power spectra based at least in part on the received data.

26. The communications device of claim 24, further comprising:
means for using the correlated output to identify a third set of one or more frequency bins where the desired positioning signal is strong relative to a fourth set of frequency bins; and
means for allocating a proportionally greater weight to the identified third set of frequency bins than the fourth set when measuring the correlated output.

27. The communications device of claim 24, further comprising:
means for allocating, when measuring the correlated output, a proportionally greater weight to a subset of the identified first set of frequency bins wherein the interfering signal is weak relative to other frequency bins of the first set.

28. A computer-readable medium tangibly embodying computer-executable instructions configured to reduce impact of cross-correlation in a desired positioning signal, the computer-readable medium comprising computer-executable instructions for:
correlating a plurality of received positioning signals with a reference code of the desired positioning signal to produce a correlated output;
processing power spectra of an interfering signal of the plurality to identify a first set of one or more frequency bins where the interfering signal is weak relative to a second set of frequency bins of the power spectra; and
allocating a proportionally greater weight to the identified first set of frequency bins than the second set when measuring the correlated output.

29. The computer-readable medium of claim 28, further comprising computer-executable instructions for:
receiving data defining transmit parameters of the interfering signal; and
calculating the power spectra based at least in part on the received data.

30. The computer-readable medium of claim 29, wherein the received data comprises a Doppler offset and a modulating data width each attributable to the interfering signal.

31. The computer-readable medium of claim 28, wherein at least one of the correlating, processing, and allocating instructions is performed using the discrete Fourier transform.

32. The computer-readable medium of claim 28, further comprising computer-executable instructions for:
using the correlated output to identify a third set of one or more frequency bins where the desired positioning signal is strong relative to a fourth set of frequency bins; and
allocating a proportionally greater weight to the identified third set of frequency bins than the fourth set when measuring the correlated output.

33. The computer-readable medium of claim 28, further comprising computer-executable instructions for:
allocating, when measuring the correlated output, a proportionally greater weight to a subset of the identified first set of frequency bins wherein the interfering signal is weak relative to other frequency bins of the first set.

34. The computer-readable medium of claim 28, further comprising computer-executable instructions for:
detecting the cross-correlation by:
identifying a power imbalance between the interfering signal and the desired positioning signal; and
identifying a Doppler difference between the interfering signal and the desired positioning signal which is zero or an integer multiple of a reference code period.

35. A processor configured to reduce impact of cross-correlation in a desired positioning signal, the processor configured to:
correlate the plurality of received positioning signals with a reference code of the desired positioning signal to produce a correlated output;
process power spectra of an interfering signal of the plurality to identify a first set of one or more frequency bins where the interfering signal is weak relative to a second set of frequency bins of the power spectra; and
allocate a proportionally greater weight to the identified first set of frequency bins than the second set when measuring the correlated output.

36. The processor of claim 35, further configured to:
calculate the power spectra based at least in part on received data defining transmit parameters of the interfering signal.

37. The processor of claim 36, wherein the received data comprises a Doppler offset and a modulating data width each attributable to the interfering signal.

38. The processor of claim 35, further configured to:
transform the received positioning signals, the reference code of the desired positioning signal, and the interfering signal from time domain to frequency domain using a discrete Fourier transform,
wherein the correlating, processing, and allocating steps are performed by the processor in the frequency domain.

39. The processor of claim 35, further configured to:
use the correlated output to identify a third set of one or more frequency bins where the desired positioning signal is strong relative to a fourth set of frequency bins;
allocate a proportionally greater weight to the identified third set of frequency bins than the fourth set when measuring the correlated output.

40. The processor of claim 35, further configured to:
allocate, when measuring the correlated output, a proportionally greater weight to a subset of the identified first set of frequency bins wherein the interfering signal is weak relative to other frequency bins of the first set.

41. A positioning system configured to reduce impact of cross-correlation in a desired positioning signal, the system comprising:
a plurality of transmitters each configured to transmit positioning signals to a mobile station, including:
a first transmitter of the plurality transmitting a desired positioning signal; and
a second transmitter of the plurality transmitting an interfering signal and data comprising signal parameters related to the interfering signal;
a base station communicatively coupled with the second transmitter, and configured to transmit the data received from the second transmitter to the mobile station; and
the mobile station, communicatively coupled with the plurality of transmitters and the base station, the mobile station configured to:
receive the positioning signals from the plurality of transmitters, including the desired positioning signal and the interfering signals;
correlate the plurality of received positioning signals with a reference code of the desired positioning signal to produce a correlated output;
receive the data transmitted from the base station;
calculate power spectra of the interfering signal based at least in part on the received data, to thereby identify a first set of one or more frequency bins where the interfering signal is weak relative to a second set of frequency bins of the power spectra; and
allocate a proportionally greater weight to the identified first set of frequency bins than the second set when measuring the correlated output.

42. The positioning system of claim 41, wherein:
the positioning system comprises a satellite positioning system; and
the plurality of transmitters comprise a plurality of satellites.

* * * * *